United States Patent [19]
Pate et al.

[11] Patent Number: 4,584,336
[45] Date of Patent: Apr. 22, 1986

[54] THERMALLY CONDUCTIVE ROOM TEMPERATURE VULCANIZABLE COMPOSITIONS

[75] Inventors: Michelle Pate; John C. Getson, both of Adrian, Mich.

[73] Assignee: SWS Silicones Corporation, Adrian, Mich.

[21] Appl. No.: 665,468

[22] Filed: Oct. 29, 1984

[51] Int. Cl.$^4$ ............................................. C08K 3/28
[52] U.S. Cl. .................................... 524/443; 524/588; 524/789
[58] Field of Search .................... 524/443, 588, 789

[56] References Cited

U.S. PATENT DOCUMENTS

| 3,070,559 | 12/1962 | Nitzsche et al. | 524/588 |
| 3,499,856 | 3/1970 | Funatsu et al. | 524/238 |
| 3,499,859 | 3/1970 | Matherly | 524/701 |
| 3,642,692 | 2/1972 | Hartlage | 524/588 |
| 3,836,489 | 9/1974 | Bargain | 524/588 |
| 4,024,933 | 5/1977 | Hinderks | 188/77 R |
| 4,123,472 | 10/1978 | Getson et al. | 525/451 |
| 4,292,225 | 9/1981 | Theodore et al. | 524/188 |
| 4,419,650 | 12/1983 | John | 423/445 |

FOREIGN PATENT DOCUMENTS

| 55-71677 | 5/1980 | Japan | 524/443 |
| 56-161461 | 12/1981 | Japan | 524/789 |

Primary Examiner—Lewis T. Jacobs

[57] ABSTRACT

This invention relates to thermally conductive one-component room temperature vulcanizable organopolysiloxane compositions containing from 30 to 95 percent by weight of filler based on the weight of the composition, of which at least 10 percent by weight of the filler is silicon nitride particles.

4 Claims, No Drawings

THERMALLY CONDUCTIVE ROOM TEMPERATURE VULCANIZABLE COMPOSITIONS

The present invention relates to silicone elastomers having thermally conductive properties and more particularly to curable organopolysiloxane compositions containing thermally conductive particulate matter.

BACKGROUND OF THE INVENTION

Various materials have been incorporated in organopolysiloxane compositions to improve the thermal conductivity of the resultant elastomers. Boron nitride, for example, has been added to organopolysiloxane compositions, such as those described in U.S. Pat. No. 3,499,859 to Matherly to form thermally conductive room temperature vulcanizable silicone elastomers. Also, U.S. Pat. No. 4,292,225 to Theodore et al describes highly filled organopolysiloxane compositions containing boron refractory powders to provide silicone elastomers having good thermally conductive properties.

In contrast to the teachings of U.S. Pat. Nos. 3,499,859 and 4,292,225, it has been found that organopolysiloxane compositions containing silicon nitride particles provide elastomers having desirable physical properties as well as excellent thermal conductivity. Moreover, the compositions of this invention are useful for insulating electrical components while they permit any heat which is generated to be conducted away from the electrical component. Furthermore, the compositions of this invention are unique in that increased filler loadings can be achieved using silicon nitride particles and the resultant elastomers have superior thermal conductivity and desirable physical properties.

It is, therefore, an object of this invention to provide a highly filled thermally conductive vulcanizable silicone elastomer containing silicon nitride particles. Another object of this invention is to provide a thermally conductive organopolysiloxane composition having unique physical properties by virtue of the fact that silicon nitride particles can be used in higher filler loadings than many other conventional thermally conductive materials. Still another object of this composition is to provide a highly filled composition which is sufficiently pliable that it can be extruded and cured. A further object of this invention is to provide highly filled silicone elastomers having improved thermal conductivity.

SUMMARY OF THE INVENTION

The foregoing objects and others which will become apparent from the following description are accomplished in accordance with this invention, generally speaking, by providing a room temperature vulcanizable organopolysiloxane composition which comprises a hydroxyl-terminated organopolysiloxane, an organosilicon crosslinking agent which is capable of crosslinking in the presence of atmospheric moisture and from 30 to 95 percent by weight of a filler, of which at least 10 percent by weight of the filler is silicon nitride particles.

DESCRIPTION OF THE INVENTION

The hydroxyl-terminated organopolysiloxane may be represented by the general formula

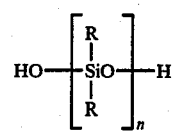

where R, which may be the same or different is a monovalent hydrocarbon radical having from 1 to 18 carbon atoms and n is a number of at least 2.

Generally, these organopolysiloxanes have from about 1.8 to about 2.25 organic groups per silicon atom and more preferably from about 1.9 to about 2.1 organic groups per silicon atom.

The organopolysiloxanes are essentially linear polymers having diorganosiloxane units ($R_2SiO$); however, they may also contain up to about 2 mole percent of other units such as $RSiO_{3/2}$, $R_3SiO_{0.5}$ and/or $SiO_{4/2}$ units in which R is the same as above. These organopolysiloxanes preferably have a viscosity of from about 5 to 300,000 mPa.s at 25° C. and more preferably a viscosity of from about 500 to 100,000 mPa.s at 25° C.

These organopolysiloxane polymers and methods for preparing the same are described, for example, in U.S. Pat. No. 2,607,792 to Warrick and U.S. Pat. No. 2,843,555 to Berridge.

Examples of monovalent hydrocarbon radicals represented by R above are alkyl radicals, such as the methyl, ethyl, propyl, butyl, hexyl, octyl, decyl and octadecyl radicals; aryl radicals such as the phenyl and naphthyl radicals; alkenyl radicals such as the vinyl and allyl radicals; aralkyl radicals such as the benzyl and phenylethyl, phenyl-propyl and phenyl-butyl radicals; alkaryl radicals such as tolyl, xylyl and ethylphenyl radicals and cycloalkyl radicals such as the cyclopropyl, cyclobutyl and cyclohexyl radicals.

The silicon nitride particles employed in the compositions of this invention are polycrystalline or amorphous materials having an average particle size of from about 0.5 to about 350 microns and more preferably from about 40 to 250 microns. The particle size is not critical as long as the particles are not so large as to be difficult to mix with the organopolysiloxane to form a homogeneous mixture.

Silicon nitride particles may be used with other fillers such as reinforcing fillers, i.e., fillers having a surface area of at least 50 m²/gm. Examples of such fillers are precipitated silicon dioxide having a surface area of at least 50 m²/gm and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 m²/gm. Examples of semi- or non-reinforcing fillers are metal oxides, metal nitrides, glass beads, bubbles, or fibers, cork, organic resins, polytetrafluoroethylene, polychlorotrifluoroethylene, polyvinyl chloride, bentonite, diatomaceous earth, crushed quartz, mica, and mixtures thereof. Preferred examples of fillers are metal oxides such as zinc oxide, ferric oxide, alumina and titanium oxide. The fillers may also be treated with, for example, triorganoalkoxysilanes, such as trimethylethoxysilane to coat the surfaces with organosiloxy groups.

The amount of fillers including silicon nitride particles which may be incorporated in the compositions of this invention is not critical and may vary over a wide range. Thus, the amount of filler including silicon nitride particles may range from about 30 to 95 percent by weight and more preferably from about 40 to 90 percent by weight, based on the weight of the composition, in which at least 10 percent by weight of the filler is silicon nitride particles. More preferably the amount of silicon nitride particles ranges from about 30 to 100 percent by weight based on the weight of the filler. It is, however, preferred that the other fillers employed in the composition not interfere with the thermal conductive of the resultant composition.

Other additives which can be incorporated into the compositions of this invention include pigments, compression set additives, oxidation inhibitors, plasticizers, adhesion promoters, base stabilizers and other materials commonly employed as additives in the silicone rubber art. Such additives are preferably present in an amount below about 15 percent by weight based on the weight of the composition.

The compositions of this invention can be crosslinked at room temperature in the presence of atmospheric moisture by adding a crosslinking agent having an average of at least two hydrolyzable groups per molecule to an organopolysiloxane having an average of at least two hydroxyl groups per molecule, and if desired a catalyst to form an elastomer.

These compositions are often referred to as one-component room temperature vulcanizable compositions. Generally, these compositions are prepared under anhydrous conditions, by mixing the organopolysiloxanes having an average of at least two Si-bonded hydroxyl groups with a crosslinking agent having an average of at least two hydrolyzable groups per molecule, and a condensation catalyst, if desired, and the silicon nitride. Other filters, such as reinforcing and semi- or non-reinforcing fillers, as well as other additives may be incorporated in these compositions.

Crosslinking agents which may be incorporated in the compositions of this invention are silanes or siloxanes having at least 2 hydrolyzable groups per molecule. Examples of suitable hydrolyzable groups are acyloxy groups (—OOCR), aminoxy groups (—ONR$_2$'), amino groups, (—NR$_2$'), acyl-amino groups (—NR'COR), oximo groups (—ON=CR$_2$') and phosphato groups

where R is the same as above and R' represents the same or different monovalent or substituted monovalent hydrocarbon radicals or hydrogen atoms. The hydrocarbon radicals recited above also apply to the monovalent hydrocarbon radicals represented by R' above. Examples of substituted monovalent hydrocarbon radicals represented by R' are halogenated hydrocarbon radicals such as the halogen substituted monovalent hydrocarbon radicals recited above as well as the 3,3,3-trifluoropropyl radical and o-, m- and p-chlorophenyl radicals.

Examples of acyloxy groups having from 1 to 18 carbon atoms are formyloxy, acetoxy, propionyloxy, valeroyloxy, caproyloxy, myristoyloxy and stearoyloxy groups.

Examples of aminoxy groups are dimethylaminoxy, diethylaminoxy, dipropylaminoxy, dibutylaminoxy, dioctylaminoxy, diphenylaminoxy, ethylmethylaminoxy and methylphenylaminoxy groups.

Examples of preferred amino groups are n-butylamino, sec-butylamino and cyclohexylamino groups.

An example of an acylamino group is the benzoylmethylamino group.

Examples of preferred oximo groups are acetophenonoximo, acetonoximo, benzophenonoximo, 2-butanonoximo, diisopropylketoximo and chlorocyclohexanonoximo groups.

Examples of phosphato groups are dimethylphosphato, diethylphosphato, dibutylphosphato, dioctylphosphato, methylethylphosphato, methylphenylphosphato and diphenylphosphato groups.

Examples of preferred silanes which may be employed as crosslinking agents in the composition of this invention are methyltriacetoxysilane, tetraacetoxysilane, methyl-tert-butoxyacetoxysilicon compounds having a total of three tert-butoxy and acetoxy groups per molecule, methyltris-(cyclohexylamino)silane, methyltris-(sec-butylamino)silane, isopropoxytriacetoxysilane, methyltris-(2-butanonoximo)silane, methyltris-(diethylphosphato)-silane and methyltris-(isopropylamino)-silane as well as methyltris-(diethylaminoxy)-silane.

The crosslinking agents are preferably employed in an amount of from about 0.5 to about 20 percent by weight and more preferably from about 1 to 10 percent by weight based on the weight of the organopolysiloxanes.

Examples of catalysts which may be employed are metallic carboxylic acid salts or organometallic carboxylic acid salts such as dibutyltin dilaurate, dibutyltin diacetate, tin-II-octoate, dibutyltin dioctoate; distannoxanes, such as diacetoxytetrabutyl distannoxane and dioleoyltetramethyl distannoxane. Other catalysts are dibutyltin butoxy chloride, ferric octoate, lead octoate, lead laurate and cobalt naphthenate; titanium esters, such as tetrabutyl titanante; amines such as n-hexylamine; amine salts such as n-hexylamine hydrochloride and n-butylamine acetate.

The catalysts are generally employed in an amount of from about 0.2 to 10 percent by weight based on the weight of the organopolysiloxanes.

Crosslinking may be accelerated by applying heat or by adding water in addition to that contained in the atmosphere or by the addition of carbon dioxide, where the crosslinking agent is an aminosilane.

In order to facilitate mixing of the crosslinking agents and/or crosslinking catalysts in the compositions, the crosslinking agents and/or the crosslinking catalysts can be dissolved or dispersed in a solvent which is inert with respect to the reactants or the catalysts employed. Examples of suitable solvents or dispersing agents are organopolysiloxanes, such as dimethylpolysiloxanes having trimethylsiloxy terminal groups and organic solvents which evaporate at room temperature. Examples of suitable organic solvents are chlorinated hydrocarbons such as trichloroethylene. When organic solvents or chlorinated organic solvents are employed, they are preferably employed in an amount of less than about 20 percent by weight based on the weight of the composition to be crosslinked.

The compositions of this invention may be stored for long periods of time under anhydrous conditions without deletrious effects and then cured by merely exposing them to atmospheric moisture at room temperature.

The compositions may be employed for many applications such as for encapsulating electronic components or boards, as thermally conductive adhesives and as thermally conductive gaskets.

In the following examples all parts are by weight unless otherwise specified.

EXAMPLE 1

Thermally conductive silicone compositions are prepared in the following manner:

| Ingredient | Parts |
| --- | --- |
| Hydroxyl-terminated dimethylpolysiloxane having a viscosity of 4000 mPa·s at 25° C. | 112 |
| Silicon nitride particles - 325 mesh (available from Afrimet-Indussa, Inc.) | 300 |
| Methyltris-(cyclohexylamino)silane | 8 |

The silicon nitride particles are added to a mixer containing the hydroxyl-terminated dimethylpolysiloxane fluid in three successive additions of 100 parts each, with a mixing time of 10 minutes between additions. After the final addition of the silicon nitride particles, the composition is mixed until homogeneous. The composition is de-aired and then the methyltris(cyclohexylamino)silane is added under an atmosphere of nitrogen.

The resultant composition is molded to form ASTM test slabs and cured for 7 days at ambient temperature in atmospheric moisture.

The physical properties of the silicone elastomer are shown in the following table.

| Physical Properties | |
| --- | --- |
| Durometer, Shore A | 67 |
| Elongation, percent | 90 |
| Tensile strength, psi. | 562 |
| Tear strength, lb./in. | 40 |

The thermal conductivity of the silicone elastomer is $8.9 \times 10^{-4}$ cal. cm.$^{-1}$ sec.$^{-1}$ °C.$^{-1}$, as determined in accordance with the procedure described in ASTM D-2214.

EXAMPLE 2

The procedure of Example 1 is repeated, except that 112 parts of a hydroxyl-terminated dimethylpolysiloxane fluid having a viscosity of 2000 mPa.s at 25° C. are substituted for the hydroxyl-terminated dimethylpolysiloxane having a viscosity of 4000 mPa.s at 25° C. The physical properties of the silicone elastomer are shown in the following table.

| Physical Properties | |
| --- | --- |
| Durometer, Shore A | 72 |
| Elongation, percent | 82 |
| Tensile strength, psi. | 565 |
| Tear strength, lb./in. | 53 |

The thermal conductivity of the silicone elastomer is $8.2 \times 10^{-4}$ cal. cm$^{-1}$ sec.$^{-1}$ °C.$^{-1}$, as determined in accordance with the procedure described in ASTM D-2214.

EXAMPLE 3

The procedure of Example 1 is repeated, except that 112 parts of a hydroxyl-terminated dimethylpolysiloxane having a viscosity of 450 mPa.s at 25° C. are substituted for the hydroxyl-terminated dimethylpolysiloxane having a viscosity of 4000 mPa.s at 25° C. The physical properties of the resultant elastomer are shown in the following table.

| Physical Properties | |
| --- | --- |
| Durometer, Shore A | 70 |
| Elongation, percent | 66 |
| Tensile strength, psi. | 509 |

The thermal conductivity of the silicone elastomer is $9.3 \times 10^{-4}$ cal. cm.$^{-1}$ sec.$^{-1}$ °C.$^{-1}$, as determined in accordance with the procedure described in ASTM D-2214.

COMPARISON EXAMPLE $V_1$

A silicone elastomer is prepared in accordance with the procedure of Example 1, except that boron nitride is substituted for silicon nitride in the following formulation.

| Ingredient | Parts |
| --- | --- |
| Hydroxyl-terminated dimethylpolysiloxane having a viscosity of 400 mPa·s at 25° C. | 100 |
| Boron nitride (325 mesh) | 75 |
| Methyltris-(cyclohexylamino)silane | 8 |

The resultant slabs are very brittle and full of deformities which render them unsuitable for testing.

COMPARISON EXAMPLE $V_2$

The procedure of Comparison Example $V_1$ is repeated, except that 70 parts of boron nitride are added to the composition. This composition is very stiff and hard to handle in the uncured state.

The physical properties are determined after curing for 7 days in atmospheric moisture.

| Physical Properties | |
| --- | --- |
| Durometer, Shore A | 46 |
| Elongation, percent | 268 |
| Tensile strength, p.s.i. | 290 |
| Tear strength, lb./in. | 50 |

The thermal conductivity of the silicone elastomer is $6.4 \times 10^{-4}$ cal. cm.$^{-1}$ sec.$^{-1}$ °C.$^{-1}$.

COMPARISON EXAMPLE $V_3$

The procedure of Example 1 is repeated except that zinc oxide is substituted for silicon nitride in the following formulation.

| Ingredient | Part |
| --- | --- |
| Hydroxyl-terminated dimethylpolysiloxane having a viscosity of 4000 mPa·s at 25°C. | 100 |
| Zinc oxide | 300 |
| Methyltris-(cyclohexylamino)- | 8 |

| Ingredient | Part |
|---|---|
| silane | |

The physical properties of the resultant silicone elastomer is determined after exposure to atmospheric moisture for 7 days.

| Physical Properties | |
|---|---|
| Durometer, Shore A | 44 |
| Elongation, percent | 199 |
| Tensile Strength, p.s.i. | 300 |
| Tear Strength, lb./in. | 37 |

The thermal conductivity of the silicone elastomer is $6.4 \times 10^{-4}$ cal. cm.$^{-1}$ sec.$^{-1}$ °C.$^{-1}$.

EXAMPLE 4

The procedure of Example 1 is repeated, except that 8 parts of methyltriacetoxysilane is substituted for methyltris(cyclohexylamino)silane.

The resultant elastomer exhibited good physical and thermal conductivity properties.

EXAMPLE 5

The procedure of Example 1 is repeated, except that 8 parts of methyltris-(2-butanonoximo)silane is substituted for methyltris-(cyclohexylamino)silane.

The resultant elastomer exhibited good physical and thermal conductivity properties.

EXAMPLE 6

The procedure of Example 1 is repeated, except that 8 parts of methyltris-(diethylaminoxy)silane is substituted for methyltris-(cyclohexylamino)silane.

The resultant elastomer exhibited good physical and thermal conductivity properties.

EXAMPLE 7

The procedure of Example 1 is repeated except that 200 parts of silicon nitride particles are added to the composition instead of the 300 parts.

The resultant elastomer exhibited good physical properties, but the thermal conductivity properties are inferior to those of the elastomer described in Example 1.

What is claimed is:

1. A room temperature vulcanizable composition having thermally conductive properties which is stable in the absence of moisture, but when exposed to moisture cures to an elastomer, said composition comprising a hydroxyl-terminated organopolysiloxane, a crosslinking agent having an average of at least two hydrolyzable groups per molecule, in which the hydrolyzable groups are selected from the group consisting of acyloxy, amino, oximo, aminoxy, acylamino and phosphato groups, and from 30 to 95 percent by weight of a filler, based on the weight of the composition of which from 30 to 100 percent by weight based on the weight of the filler is silicon nitride particles.

2. The composition of claim 1, wherein the silicon nitride particles are present in an amount of from 40 to 90 percent by weight based on the weight of the filler.

3. The composition of claim 1, wherein the silicon nitride particles have a particle size of from 0.5 to 350 microns.

4. A method for preparing a silicone elastomer having thermally conductive properties which comprises mixing under anhydrous conditions a hydroxyl-terminated organopolysiloxane, a crosslinking agent having an average of at least two hydrolyzable groups per molecule, in which the hydrolyzable groups are selected from the group consisting of acyloxy, amino, oximo, aminoxy, acylamino and phosphato groups and from 30 to 95 percent by weight of a filler, based on the weight of the composition of which from 30 to 100 percent by weight based on the weight of the filler is silicon nitride particles, and thereafter exposing the resultant composition to atmospheric moisture.

* * * * *